United States Patent [19]

Sandstrom et al.

[11] Patent Number: 4,960,819
[45] Date of Patent: Oct. 2, 1990

[54] FAST CURING RUBBER BLEND

[75] Inventors: Paul H. Sandstrom, Tallmadge; Emil M. Friedman, Cleveland Heights, both of Ohio

[73] Assignee: The Goodyear Tire & Rubber Company, Akron, Ohio

[21] Appl. No.: 380,046

[22] Filed: Jul. 14, 1989

Related U.S. Application Data

[63] Continuation-in-part of Ser. No. 748,286, Jun. 24, 1985.

[51] Int. Cl.$^5$ .......................... C08L 7/00; C08L 9/00; C08L 9/06; C08L 39/08
[52] U.S. Cl. ................................. 524/516; 524/526; 525/192; 525/203
[58] Field of Search .............. 525/279, 203, 232, 192; 524/516, 526

[56] References Cited

U.S. PATENT DOCUMENTS 3,114,409  12/1963  Iknayan et al. ..................... 152/330

FOREIGN PATENT DOCUMENTS 1263290  11/1964  Fed. Rep. of Germany .

*Primary Examiner*—Allan M. Lieberman
*Attorney, Agent, or Firm*—Alvin T. Rockhill

[57] ABSTRACT

It is highly desirable to be able to cure rubbers quickly since the amount of energy required for the curing process is reduced and the number of articles that can be cured in a mold in a given time is increased. In other words, the cycle time needed to cure articles made from such a rubber is reduced and the throughput of a mold utilized in curing such a rubber is increased. Unfortunately, most attempts to accelerate the cure rate of rubber have resulted in the rubber having poor scorch safety. The present invention discloses a fast curing rubber blend having excellent scorch safety which comprises: (a) from 50 to 98 weight percent of at least one polydiene rubber, and (b) from 2 to 50 weight percent of at least one vinylpyridine copolymer comprised of repeat units which are derived from a diene monomer and vinylpyridine wherein from 1 to 75 weight percent of the repeat units in said copolymer are derived from vinylpyridine.

21 Claims, No Drawings

FAST CURING RUBBER BLEND

This is a continuation-in-part of application Ser. No. 06/748,286, filed on June 24, 1985.

BACKGROUND OF THE INVENTION

It is highly desirable to reduce the cycle time needed to cure a rubber article since more articles can be cured in a given mold per unit time. Reducing the duration of a cure cycle also generally results in energy savings.

Organic accelerators have been used for many years in order to make rubbers cure more quickly. Aniline was one of the first organic compounds used to accelerate the vulcanization of rubber. However, it was objectionable because of its toxicity. It was later discovered that the reaction product of aniline with carbon disulfide, namely thiocarbanilide, was more effective as an accelerator and less toxic. It then became the first widely used organic accelerator. In 1921, mercaptobenzothiazole was introduced as an accelerator for rubber vulcanization and it is still being used commercially as an accelerator today. Currently, a wide variety of accelerators are being utilized commercially including, thiazole accelerators such as benzothiazyl disulfide and 2-mercaptobenzothiazole: sulfenamide accelerators, such as N-oxydiethylene benzothiazole-2-sulfenamide and N-cyclohexyl-2-benzothiazolesulfenamide; dithiocarbamate accelerators, such as, bismuth dimethyldithiocarbamate, cadmium diethyldithiocarbamate, copper dimethyldithiocarbamate, lead dimethyldithiocarbamate, selenium diethyldithiocarbamate, and zinc dimethyldithiocarbamate; thiuram accelerators, such as, tetramethylthiuram disulfide and tetraethylthiuram disulfide: and thiourea accelerators, such as, tetramethylthiuram monosulfide, dimethylethyl thiourea, and trimethyl thiourea. Commercial or organic accelerators of this type can reduce the time required to vulcanize a rubber by at least 50 percent.

The incorporation of an accelerator into a rubber generally results in the rubber having a greater tendency to scorch. Scorch is the premature crosslinking of an elastomer which can render the elastomer totally unsuitable for many applications. Improving a rubber's cure rate without adversely affecting its scorch safety or other properties has proven to be a very formidable problem.

SUMMARY OF THE INVENTION

It has been unexpectedly discovered that vinylpyridine copolymers can be blended with polydiene rubbers in order to improve the cure rate of the rubber blend without significantly affecting scorch safety. More specifically, the present invention discloses a fast curing rubber blend comprising: (a) from 50 to 98 weight percent of at least one polydiene rubber, and (b) from 2 to 50 weight percent of at least one vinylpyridine copolymer comprised of a diene monomer and vinylpyridine wherein from 1 to 75 weight percent of the repeat units in said copolymer are derived from vinylpyridine. Preferably, the product of the weight fraction of said vinylpyridine copolymer in said rubber blend and the weight fraction of repeat units derived from vinylpyridine in said vinylpyridine copolymer is between 0.001 and 0.1.

DETAILED DESCRIPTION OF THE INVENTION

Vinylpyridine copolymers can be blended into polydiene rubbers in order to make the polydiene rubber cure faster. The polydiene rubbers which can be utilized in the blends of this invention include natural rubber and homopolymers made by polymerizing diene monomers, such as butadiene, isoprene, piperylene, and the like. Copolymers of one or more diene monomers can also be utilized as the polydiene rubber in the blends of this invention. The polydiene rubbers utilized in such blends can also be copolymers or terpolymers of diene monomers with one or more other ethylenically unsaturated monomers. Some representative examples of ethylenically unsaturated monomers that can potentially be utilized in the polydiene rubbers of such blends include alkyl acrylates, such as methyl acrylate, ethyl acrylate, butyl acrylate, methyl methacrylate and the like; vinylidene monomers having one or more terminal $CH_2=C$- groups; vinyl aromatics such as styrene, $\alpha$-methylstyrene, bromostyrene, chlorostyrene, fluorostyrene and the like: $\alpha$-olefins such as ethylene, propylene, 1-butene, and the like; vinyl halides, such as vinylbromide, chloroethene (vinylchloride), vinylfluoride, vinyliodide, 1,2-dibromoethene, 1,1-dichloroethene (vinylidene chloride), 1,2-dichloroethene, and the like; vinyl esters such as vinyl acetate; $\alpha,\beta$-olefinically unsaturated nitriles, such as acrylonitrile and methacrylonitrile: $\alpha,\beta$-olefinically unsaturated amides, such as acrylamide, N-methyl acrylamide, N,N-dimethylacrylamide, methacrylamide and the like. The polydiene rubbers which are copolymers of one or more diene monomers with one or more other ethylenically unsaturated monomers will normally contain from about 50 weight percent to about 99 weight percent diene monomers and from about 1 weight percent to about 50 weight percent of the other ethylenically unsaturated monomers in addition to the diene monomers. For example, copolymers of diene monomers with vinylaromatic monomers, such as styrene-butadiene rubber (SBR) which contain from 50 to 95 weight percent diene monomers and from 5 to 50 weight percent vinylaromatic monomers are useful in many applications.

The vinylpyridine copolymers which are utilized in the blends of this invention are comprised of repeat units which are derived from a diene monomer and vinylpyridine. Such copolymers can contain repeat units which are derived from more than one type of diene monomer as well as other ethylenically unsaturated monomers in addition to the diene monomers. From 1 to 75 weight percent of the repeat units in such vinylpyridine copolymers will be derived from vinylpyridine. Such repeat units have the structural formula

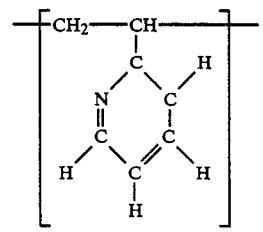

and differ from the vinylpyridine monomer from which they were derived in that the vinyl double bond was consumed in the polymerization.

From 25 to 99 weight percent of the repeat units in such vinylpyridine copolymers are derived from diene monomers and other ethynically unsaturated monomers in addition to diene monomers and vinylpyridine. For example, the vinylpyridine copolymer can be a copolymer containing 50 percent butadiene and 50 percent vinylpyridine (having 50 percent of its repeat units being derived from vinylpyridine) which can be represented by the structural formula

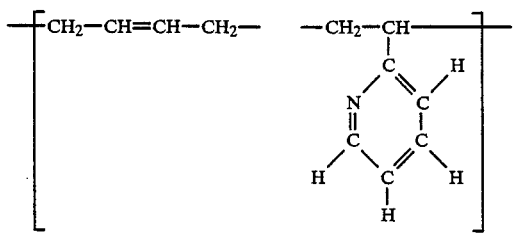

wherein — — indicates that the repeat units derived from butadiene and vinylpyridine can be in any order. The structural formula shown above illustrates the polymer produced when there has been 1,4 addition of the butadiene. The vinylpyridine copolymer will preferably have 3 percent to 30 percent by weight of its repeat units being derived from vinylpyridine and from 70 to 97 weight percent of its repeat units being derived from diene monomers and other ethynically unsaturated monomers. Most preferably, the vinylpyridine copolymer will contain from 4 to 10 weight percent vinylpyridine and from 90 to 96 weight percent diene monomers.

The fast curing blends of this invention will normally contain from 50 to 98 weight percent of at least one polydiene rubber and from 2 to 50 weight percent of at least one vinylpyridine copolymer (based upon the total rubber in the blend). Preferably, such blends will be comprised of from 55 to 96 weight percent of one or more polydiene rubbers and from 4 to 45 weight percent of one or more vinylpyridine copolymers. Most preferably, the fast curing blends of this invention will be comprised of from 60 to 85 weight percent polydiene rubbers and from 15 to 40 weight percent vinylpyridine copolymers.

As a general rule, the overall concentration of repeat units derived from vinylpyridine constitutes from about 0.1 to about 10 weight percent of the rubber blend (0.001 to 0.1 as a weight fraction). In other words, the product of the weight fraction of vinylpyridine copolymer in the rubber blend and the weight fraction of repeat units derived from vinylpyridine in the vinylpyridine copolymer will generally range between 0.001 and 0.1 (that is, between 0.1 and 10 weight percent). For example, if the vinylpyridine copolymer contains 5 weight percent vinylpyridine and there is 30 weight percent of that vinylpyridine copolymer in the rubber blend, then the product of the weight fraction of said vinylpyridine copolymer in said rubber blend and the weight fraction of repeat units derived from vinylpyridine in said vinylpyridine copolymer is 0.015, that is, 1.5%. Preferably, the product of the weight fraction of said vinylpyridine copolymer in said rubber blend and the weight fraction of repeat units derived from vinylpyridine in said vinylpyridine copolymer will range between 0.005 and 0.05. More preferably, this product will range between 0.01 and 0.03, (that is, between 1% and 3%).

Even though vinylpyridine copolymers which are derived from a wide variety of different monomers can be blended with polydiene rubbers in order to improve the cure characteristics of the polydiene rubber in the resultant blend, it is preferable to utilize a vinylpyridine copolymer which is compatible with the polydiene rubber in the blend. For example, if the polydiene rubber in the blend is polybutadiene, it would be preferable to utilize a copolymer of vinylpyridine and butadiene as the vinylpyridine copolymer in the blend. If the polydiene rubber utilized in the blend is a styrene butadiene rubber, then it is preferable to utilize a terpolymer of butadiene, styrene, and vinylpyridine as the vinylpyridine copolymer in the blend. In order to optimize compatibility, it is often desirable to utilize the same relative ratio of monomers in the vinylpyridine copolymer as is present in the polydiene rubber.

The polydiene rubbers and the vinylpyridine copolymers utilized in the blends of this invention can be prepared using polymerization techniques well known to persons skilled in the art. In most cases, these polymers will be prepared using emulsion polymerization techniques. A wide variety of polydiene rubbers which are suitable for use in the blends of this invention are commercially available. For example, The Goodyear Tire & Rubber Company sells nitrile rubber (NBR) under the tradename Chemigum TM, styrene butadiene rubber (SBR) under the tradename Plioflex TM, polybutadiene under the tradename Budene TM, and synthetic polyisoprene under the name Natsyn TM; Exxon Chemical Americas sells ethylene propylene diene rubber (EPDM) under the tradename Vistalon TM, and polyisobutylene under the tradename Vistanex TM; and natural rubber is sold by a number of suppliers.

Conventional levels of conventional accelerators should be added to the fast curing rubber blends of this invention. Such rubber blends can additionally contain other conventional compounding ingredients such as carbon black, sulfur, fillers, oils, waxes, colorants, scorch inhibiting agents, and processing aids.

In most cases, the fast curing rubber blends of this invention will consist of (a) at least one polydiene rubber, (b) at least one vinylpyridine copolymer, (c) sulfur and/or a sulfur containing compound, (d) at least one filler, (e) at least one accelerator, (f) at least one antidegradant, (g) at least one processing oil (h) zinc oxide, (i) optionally a tackifier resin, (j) optionally a reinforcing resin, (k) optionally one or more fatty acids, (1) optionally a peptizer, and (m) optionally one or more scorch inhibiting agents. The fast curing rubber blend will normally contain from 0.5 to 5 phr (parts per 100 parts of rubber) of sulfur and/or a sulfur containing compound with 1 to 2.5 phr being preferred. It may be desirable to utilize insoluble sulfur in cases where bloom is a problem.

Normally from 10 to 150 phr of at least one filler will be utilized in the blend with 30 to 80 phr being preferred. In most cases at least some carbon black will be utilized in the filler. The filler can, of course, be comprised totally of carbon black. Silica can be included in the filler to improve tear resistance and heat build up. Clays and/or talc can be included in the filler to reduce cost. The blend will also normally include from 0.1 to 2.5 phr of at least one accelerator with 0.2 to 1.5 phr being preferred. Antidegradants, such as antioxidants and antiozonants, will generally be included in the blend in amounts ranging from 0.25 to 10 phr with amounts in the range of 1 to 5 phr being preferred. Processing oils will generally be included in the blend in amounts ranging from 2 to 100 phr with amounts ranging from 5 to 50 phr being preferred. The fast curing blends of this invention will also normally contain from 0.5 to 10 phr of zinc oxide with 1 to 5 phr being preferred. These blends can optionally contain from 0 to 10 phr of a tackifier resin, 0 to 10 phr of reinforcing resins, 1 to 10 phr of fatty acids, 0 to 2.5 phr of peptizers, and 0 to 1 phr of scorch inhibiting agents.

The fast curing rubber blends of this invention do not contain significant amounts (more than about 0.01 phr) of dicumyl peroxide or lead oxide. In most cases the rubber blends of this invention will not contain any dicumyl peroxide or lead oxide.

Such fast curing rubber blends can be prepared by simply blending or mixing together the polydiene rubber and the vinylpyridine copolymer. This blending can be accomplished utilizing compounding techniques well known to persons skilled in the art. For example, the polydiene rubber can be mixed with the vinylpyridine copolymer in a Banbury mixer or on a mill mixer to produce a blend of the polydiene rubber with the vinylpyridine copolymer. Such a blend could also be made by mixing a polydiene rubber latex with a vinylpyridine copolymer latex followed by coagulating the mixed latices. The technique used in the preparation of the blend is not important as long as there is a thorough mixing of the vinylpyridine copolymer throughout the polydiene rubber.

Fast curing rubber blends can be prepared in a manner so that they have essentially the same physical and chemical properties as the polydiene rubber utilized in them, except of course, for the greatly improved cure properties of the blends. In other words, vinylpyridine copolymers can be blended with diene rubbers to produce blends having improved cure characteristics which have mechanical and chemical properties which are much like those of the diene rubber. In order to minimize the differences in the properties between a diene rubber and a fast curing rubber blend, it will generally be desirable to utilize a vinylpyridine copolymer which is compatible with and which has properties which are similar to those of the diene rubber. For example, the incorporation of vinylpyridine into a polymer will change its glass transition temperature, and it may be desirable to incorporate greater or lesser amounts of other monomers into such vinylpyridine copolymers in order to compensate for this tendency for the vinylpyridine copolymer to have a different glass transition temperature than its vinylpyridine-free counterpart. In any case, since the vinylpyridine copolymer represents only a minority of the fast curing blend, its influence on the overall properties of the blend is minimized and is normally not at all detrimental. This is in contrast to the situation wherein a small amount of vinylpyridine is copolymerized into a rubber in order to improve its cure properties.

In many cases, it is desirable to improve the cure rates of conventional rubber blends. For example, it may be desirable to improve the cure rate of a blend of medium vinyl polybutadiene and high cis-polybutadiene. In such cases, one of the components in the blend can be modified by copolymerizing vinylpyridine into it. Of course, vinylpyridine copolymers can also be added to such blends as a third component in order to improve the cure rate of the blend without reducing its scorch safety.

This invention is illustrated by the following examples which are merely for the purpose of illustration and are not to be regarded as limiting the scope of the invention or manner in which it may be practiced. Unless specifically indicated otherwise, parts and percentages are given by weight.

EXAMPLE 1

A blend containing 70 weight percent medium vinyl polybutadiene and 30 weight percent of an emulsion polymerized copolymer of butadiene and vinylpyridine was prepared. The vinylpyridine copolymer utilized in this blend was prepared by standard emulsion polymerization techniques utilizing a 5 weight percent charge of vinylpyridine and had a Mooney (ML/4@100° C.) of 60. The polymer blend was mixed with carbon black, processing oil, waxes and antioxidant in a laboratory BR Banbury. A standard cure recipe containing zinc oxide, stearic acid, sulfur and accelerators was included during a final Banbury mix. The cure rate of this blend composition was then determined using a Monsanto rheometer. The cure time, $t_{90}$, to reach 90 percent of complete cure was determined to be 12.5 minutes, and the scorch time, $t_2$, to reach a 2 point rise on the rheometer curve from the minimum value was determined to be 5.8 minutes. A repeat of this experiment with a separate Banbury mix gave a $t_{90}$ value of 13.5 minutes and a $t_2$ of 6.0 minutes.

EXAMPLE 2

The procedure described in Example 1 was repeated except that an emulsion polymerized polybutadiene having a Mooney of 66 was substituted for the vinylpyridine copolymer utilized in Example 1. In this experiment, $t_{90}$ was determined to be 20.5 minutes and $t_2$ was determined to be 5.3 minutes. A repeat of this experiment with a separate Banbury mix gave a $t_{90}$ value of 21.5 minutes and a $t_2$ of 6.5 minutes.

EXAMPLE 3

The procedure described in Example 1 was repeated except that Budene TM 1207 was substituted for the vinylpyridine copolymer. Budene TM 1207 is a synthetic solution polymerized polybutadiene. In this experiment, $t_{90}$ was determined to be 19.0 minutes and $t_2$ was determined to be 6.5 minutes. A repeat of this experiment with a separate Banbury mix gave a $t_{90}$ value of 17.5 minutes with $t_2$ being determined to be 6.3 minutes.

EXAMPLE 4

The procedure described in Example 1 was repeated except that an emulsion polymerized polybutadiene having a Mooney of 42 was substituted for the vinylpyridine copolymer utilized in Example 1. In this experiment, $t_{90}$ was determined to be 24.0 minutes and $t_2$ was determined to be 6.5 minutes. A repeat of this experiment with a separate Banbury mix gave a $t_{90}$ value of 22.5 minutes and a $t_2$ of 6.5 minutes.

EXAMPLE 5

A blend containing 70 weight percent of emulsion polymerized SBR 1712 and 30 weight percent of an emulsion polymerized copolymer of butadiene and vinylpyridine was prepared. The vinylpyridine copolymer utilized in this blend contained a 5 weight percent charge of vinylpyridine and was oil extended with 25 parts per hundred of rubber with an aromatic oil. The oil extended Mooney was 54. The polymer blend was mixed with carbon black, processing oil, waxes and antioxidant in a laboratory BR Banbury. A standard cure recipe containing zinc oxide, stearic acid, sulfur and accelerators was included during a final Banbury mix. The cure rate of this blend composition was then determined using a Monsanto rheometer. In this experiment, $t_{90}$ was determined to be 13.7 minutes and $t_2$ was determined to be 6.5 minutes. A repeat of this experiment with a separate Banbury mix gave a $t_{90}$ value of 14.5 minutes and a $t_2$ of 6.8 minutes.

EXAMPLE 6

The procedure described in Example 5 was repeated except that an oil extended emulsion polybutadiene (25 phr aromatic oil, Mooney=62) was substituted for the vinylpyridine copolymer utilized in Example 5. In this experiment, $t_{90}$ was determined to be 21.4 minutes and $t_2$ was determined to be 7.3 minutes. A repeat of this experiment with a separate Banbury mix gave a $t_{90}$ value of 23.5 minutes and a $t_2$ of 7.3 minutes.

EXAMPLE 7

The procedure described in Example 5 was repeated except that an oil extended solution polybutadiene (25 phr aromatic oil, Mooney=50) was substituted for the vinylpyridine copolymer utilized in Example 5. In this experiment, $t_{90}$ was determined to be 17.8 minutes and $t_2$ was determined to be 6.0. A repeat of this experiment with a separate Banbury mix gave a $t_{90}$ value of 20.3 and a $t_2$ of 7.0 minutes.

EXAMPLE 8

The procedure described in Example 5 was repeated except that an oil extended emulsion polymerized copolymer of butadiene and vinylpyridine (25 phr aromatic oil, 5 weight percent charge of vinylpyridine, Mooney=66) was substituted for the vinylpyridine copolymer utilized in Example 5. In this experiment, $t_{90}$ was determined to be 15.0 minutes and $t_2$ was determined to be 7.0 minutes. A repeat of this experiment with a separate Banbury mix gave a $t_{90}$ value of 14.5 minutes and a $t_2$ of 6.8 minutes.

The Rheometer data for Examples 1–8 is summarized in Table I. It is very apparent that the cure rate of the blends which contained vinylpyridine copolymers (Examples 1, 5 and 8) was much better (faster) than it was in the controls (Examples 2, 3, 4, 6 and 7) wherein a vinylpyridine copolymer was not included in the blend. It is also very clear that the scorch safety of the blends containing vinylpyridine copolymers do not differ substantially from that of the controls.

While certain representative embodiments and details have been shown for the purpose of illustrating the present invention, it will be apparent to those skilled in this art that various changes and modifications can be made therein without departing from the scope of the present invention.

TABLE I

| | Rheometer Data | | | |
|---|---|---|---|---|
| Example | Maximum Torque | Minimum Torque | $T_{90}$ Minutes | $T_2$ Minutes |
| 1 | 36.5 | 10.2 | 12.5 | 5.8 |
|   | 36.9 | 10.5 | 13.5 | 6.0 |
| 2 | 35.3 | 10.2 | 20.5 | 5.3 |
|   | 35.0 | 10.5 | 21.5 | 6.5 |
| 3 | 36.5 | 10.2 | 19.0 | 6.5 |
|   | 36.0 | 10.3 | 17.5 | 6.3 |
| 4 | 35.0 | 9.8  | 24.0 | 6.5 |
|   | 35.2 | 9.6  | 22.5 | 6.5 |
| 5 | 29.6 | 7.8  | 13.7 | 6.5 |
|   | 29.8 | 7.9  | 14.5 | 6.5 |
| 6 | 28.0 | 8.4  | 21.5 | 7.3 |
|   | 28.1 | 8.3  | 23.5 | 7.3 |
| 7 | 30.4 | 8.2  | 17.8 | 6.0 |
|   | 30.0 | 7.8  | 20.3 | 7.0 |
| 8 | 29.4 | 7.9  | 15.0 | 7.0 |
|   | 29.8 | 7.9  | 14.5 | 6.8 |

What is claimed is:

1. A fast curing rubber blend comprising:
   (a) from 50 to 98 weight percent of at least one polydiene rubber, and
   (b) from 2 to 50 weight percent of at least one vinylpyridine copolymer comprised of repeat units which are derived from a diene monomer and vinylpyridine wherein from 1 to 75 weight percent of the repeat units in said vinylpyridine copolymer are derived from vinylpyridine; wherein the product of the weight fraction of vinylpyridine copolymer in said rubber blend and the weight fraction of repeat units derived from vinylpyridine in said vinylpyridine copolymer is between about 0.001 and about 0.1; and wherein the fast curing rubber blend does not contain a significant amount of dicumyl peroxide or lead oxide.

2. A fast curing rubber blend as specified in claim 1 wherein said blend is comprised of from 4 to 45 weight percent of said vinylpyridine copolymer and from 55 to 96 weight percent of said polydiene rubber.

3. A fast curing rubber blend as specified in claim 2 wherein from 3 to 30 weight percent of the repeat units in said vinylpyridine copolymer are derived from vinylpyridine.

4. A fast curing rubber blend consisting of:
   (a) from 50 to 98 weight percent of at least one polydiene rubber, based upon the total weight of the rubber in the blend,
   (b) from 2 to 50 weight percent of at least one vinylpyridine copolymer comprised of repeat units which are derived from a diene monomer and vinylpyridine, based upon the total weight of the rubber in the blend, wherein from 1 to 75 weight percent of the repeat units in said vinylpyridine copolymer are derived from vinylpyridine; wherein the produce of the weight fraction of vinylpyridine copolymer in said rubber blend and the weight fraction of repeat units derived from vinylpyridine in said vinylpyridine copolymer is between about 0.001 to about 0.1,
   (c) sulfur and/or a sulfur containing compound,
   (d) at least one rubber composition filler,
   (e) at least one accelerator,
   (f) at least one antidegradant,
   (g) at least one processing oil,
   (h) zinc oxide,
   (i) from 0 to 10 phr of a tackifier resin,
   (j) from 0 to 10 phr of a reinforcing resin, (k) from 0 to 10 phr of one or more fatty acids,
(l) from 0 to 2.5 phr of a peptizer, and
(m) from 0 to 1 phr of one or more scorch inhibiting agents.

5. A fast curing rubber blend as specified in claim 4 wherein said polydiene rubber is polybutadiene and wherein said vinylpyridine copolymer is a copolymer of butadiene and vinylpyridine.

6. A fast curing rubber blend as specified in claim 4 wherein said polydiene rubber is a copolymer of butadiene and styrene and wherein said vinylpyridine copolymer is a terpolymer of vinylpyridine, butadiene, and styrene.

7. A fast curing rubber blend as specified in claim 4 wherein said polydiene rubber is polyisoprene and wherein said vinylpyridine copolymer is a copolymer of isoprene and vinylpyridine.

8. A fast curing rubber blend as specified in claim 5 wherein the product of the weight fraction of the vinylpyridine copolymer in said rubber blend and the weight fraction of repeat units derived from vinylpyridine in said vinylpyridine copolymer is between 0.005 and 0.05.

9. A fast curing rubber blend as specified in claim 8 wherein said rubber blend is comprised of from 15 to 40 weight percent of said vinylpyridine copolymer and from 60 to 85 weight percent of said polydiene rubber.

10. A fast curing rubber blend as specified in claim 3 wherein from 4 to 10 weight percent of the repeat units in said vinylpyridine copolymer are derived from vinylpyridine.

11. A fast curing rubber blend as specified in claim 10 wherein said rubber blend is comprised of from 15 to 40 weight percent of said vinylpyridine copolymer and from 60 to 85 weight percent of said polydiene rubber.

12. A fast curing rubber blend as specified in claim 11 wherein said polydiene rubber is polybutadiene.

13. A fast curing rubber blend as specified in claim 11 wherein said polydiene rubber is a copolymer of butadiene and isoprene.

14. A fast curing rubber blend as specified in claim 11 wherein said polydiene rubber is polyisoprene.

15. A fast curing rubber blend as specified in claim 3 wherein the product of the weight fraction of vinylpyridine copolymer in said rubber blend and the weight fraction of repeat units derived from vinylpyridine in said vinylpyridine copolymer is between 0.01 and 0.03.

16. A fast curing rubber blend as specified in claim 15 wherein said polydiene rubber is a member selected from the group consisting of polybutadiene; polyisoprene: and copolymers of butadiene and isoprene.

17. A fast curing rubber blend as specified in claim 12 wherein said vinylpyridine copolymer is a copolymer of butadiene and vinylpyridine.

18. A fast curing rubber blend as specified in claim 11 wherein the product of the weight fraction of vinylpyridine copolymer in said rubber blend and the weight fraction of repeat units derived from vinylpyridine in said vinylpyridine copolymer is between 0.01 and 0.03.

19. A fast curing rubber blend as specified in claim 3 wherein the product of the weight fraction of the vinylpyridine copolymer in said rubber blend and the weight fraction of repeat units derived from vinylpyridine in said vinylpyridine copolymer is between 0.005 and 0.05.

20. A fast curing rubber blend as specified in claim 4 wherein said filler is selected from the group consisting of carbon black, silica, clays and talc.

21. A fast curing rubber blend as specified in claim 4 wherein said filler is carbon black.

* * * * *